United States Patent
Sakurai et al.

(10) Patent No.: US 6,707,070 B2
(45) Date of Patent: Mar. 16, 2004

(54) WAVELENGTH-TUNABLE LIGHT EMITTING DEVICE

(75) Inventors: Makoto Sakurai, Wako (JP); Masakazu Aono, Wako (JP)

(73) Assignee: Riken, Wako (JP)

( * ) Notice: Subject to any disclaimer, the term of this patent is extended or adjusted under 35 U.S.C. 154(b) by 0 days.

(21) Appl. No.: 10/119,309

(22) Filed: Apr. 10, 2002

(65) Prior Publication Data

US 2002/0179915 A1 Dec. 5, 2002

Related U.S. Application Data

(63) Continuation-in-part of application No. 09/406,683, filed on Sep. 27, 1999, now abandoned.

(30) Foreign Application Priority Data

Sep. 25, 1998 (JP) .............................. 10-271993

(51) Int. Cl.$^7$ .......................... H01L 33/00; G01N 23/00
(52) U.S. Cl. ............................. 257/91; 257/9; 257/25; 257/30; 313/506; 313/509; 250/306; 250/307
(58) Field of Search .............................. 257/91, 99, 9, 257/25, 30, 103; 250/306, 307, 309, 311, 492.2; 313/506, 509

(56) References Cited

U.S. PATENT DOCUMENTS

| 4,539,089 A | * | 9/1985 | Binnig et al. .......... 204/192.12 |
| 4,942,299 A | * | 7/1990 | Kazmerski ................... 250/306 |
| 5,559,330 A | * | 9/1996 | Murashita ................... 250/306 |

* cited by examiner

*Primary Examiner*—Minhloan Tran
*Assistant Examiner*—Tan Tran
(74) *Attorney, Agent, or Firm*—Jacobson Holman PLLC

(57) ABSTRACT

A wavelength-tunable light emitting device includes a substrate having an atomic-scale structure formed on a surface thereof, a needle member for locally applying a voltage through a vacuum space or a transparent insulating member to the substrate to cause a tunnel current to flow through the atomic-scale structure, and a variable-voltage power supply capable of varying voltage applied across the gap between the substrate and the needle member. The gap between the first member and the second member is as close as a few nm in length. A tunnel current flows from the tip of the needle member to the atomic-scale structure when a predetermined voltage is applied across the gap between the substrate and the needle member; and light is emitted from a tunneling region in which the tunnel current flows, because of an optical transition between respective localized states of the substrate and the needle. The wavelength of the light varies when the voltage applied across the gap between the substrate and the needle member is varied.

8 Claims, 5 Drawing Sheets

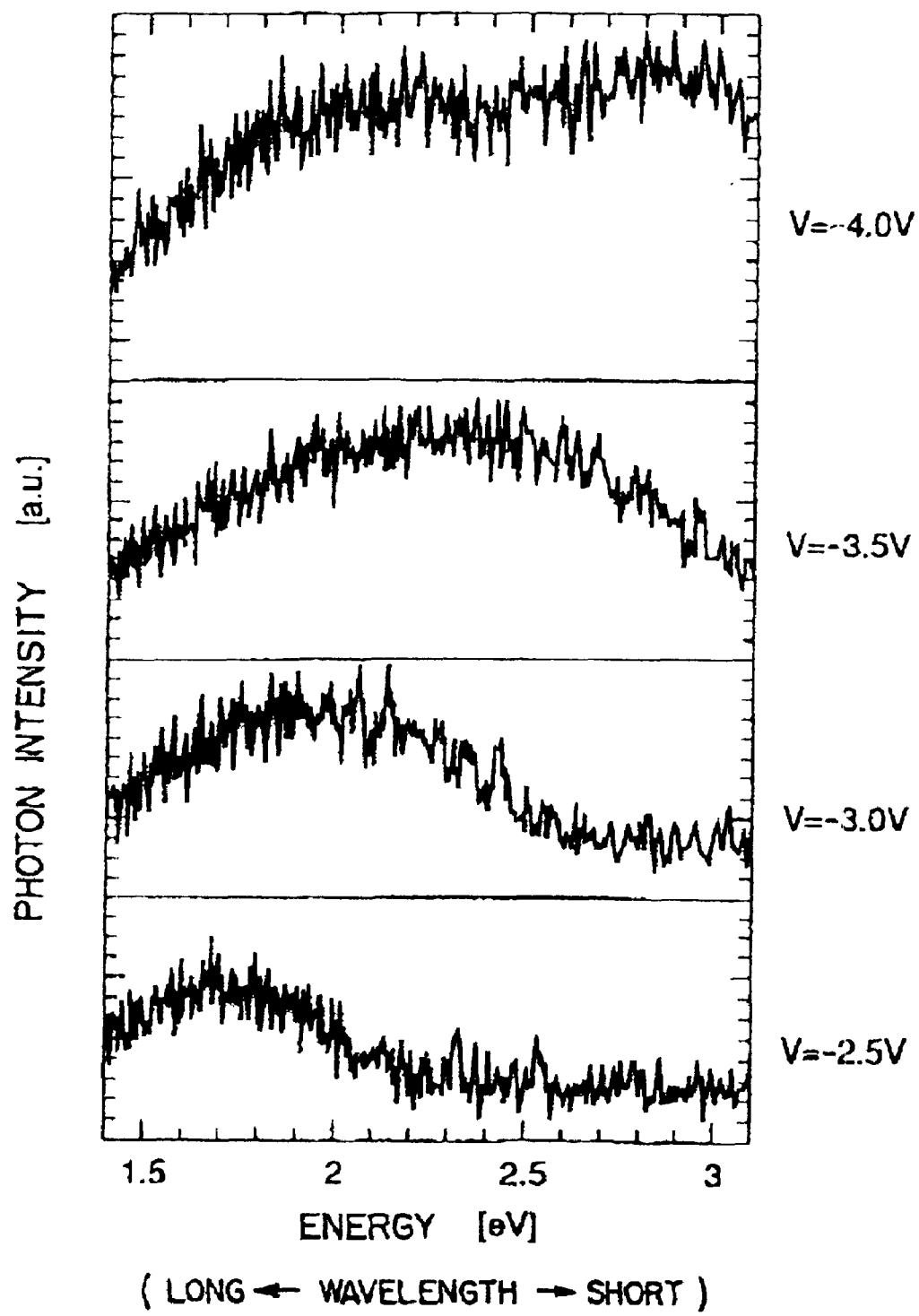
F I G. 4

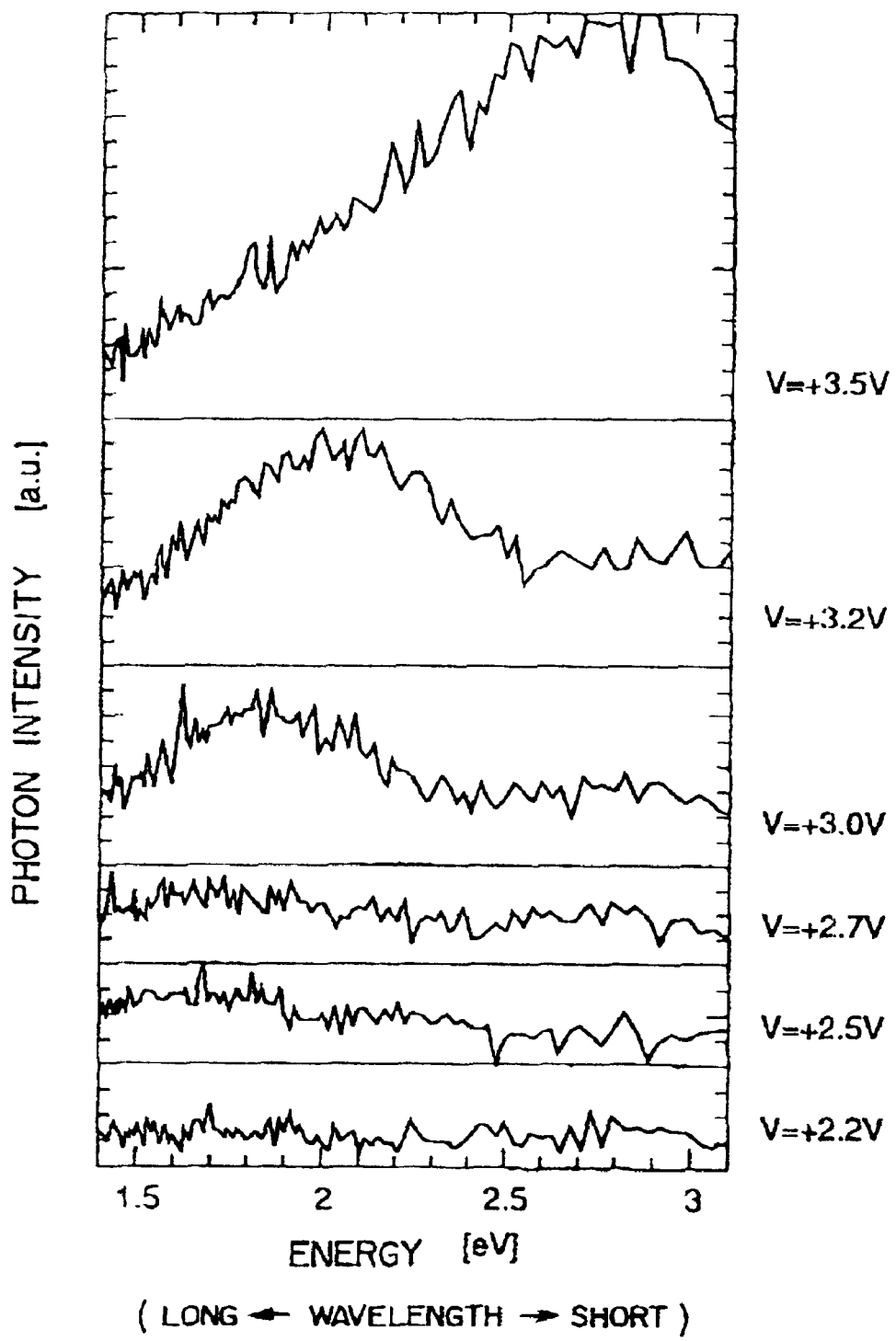
F I G. 5

WAVELENGTH-TUNABLE LIGHT EMITTING DEVICE

This is a Continuation-in-Part of U.S. Ser. No. 09/406,683 filed Sep. 27, 1999 now abandoned.

BACKGROUND OF THE INVENTION

1. Field of the Invention

The present invention relates to a wavelength-tunable light emitting device and, more particularly, to a wavelength-tunable light emitting device capable of being easily and flexibly tuned for emitting light of a desired wavelength.

2. Description of the Related Art

Conventional light emitting devices include semiconductor lasers, light-emitting diodes and solid-state lasers. Generally, light emitting devices are fixed-wavelength light emitting devices that emit light of a wavelength specific to a substrate employed therein to produce light. There is a previously proposed wavelength-tunable light emitting device, such as a solid-state laser capable of emitting light of variable wavelength variable in a predetermined wavelength range by utilizing crystal structure (e.g., phonon final level).

SUMMARY OF THE INVENTION

The prior art wavelength-tunable light emitting device needs to employ a material of a complicated crystal structure as its substrate and has difficulty in securing a sufficiently wide wavelength range in the visible region.

The present invention has been made in view of the foregoing problems and it is therefore an object of the present invention to provide a wavelength-tunable light emitting device capable of being easily and flexibly tuned for emitting light of a desired wavelength.

The present invention provides a wavelength-tunable light emitting device including: a first member; a second member spaced from the first member through a vacuum space or a transparent insulating member; and a variable-voltage power supply for applying a voltage between the first member and the second member to cause a tunnel current to flow, said variable-voltage power supply being adapted to vary the voltage applied between the first member and the second member. In the present invention, the gap between the first member and the second member is set at a few nm in length so that light emission from a local region, i.e., a tunneling region, in which the tunnel current flows, is induced by the optical transition between the respective localized states of the first member and the second member.

It is preferred that the first member and the second member are made of a material that restrains light emission caused by recombination of electrons and holes. Also, it is preferred that the device of the present invention further comprises means for inducing surface plasmons of the first member or the second member to intensify the light emitted from the tunneling region.

Also, it is preferred that the first member and the second member are formed by defining patterns in a layer that is formed on an insulating support. In addition, it is preferred that the first member and the second member are layers that are layered on an insulating support, with the first member and the second member being layered via a transparent insulating layer so as to form the gap between the first member and the second member.

According to the present invention, the variable-voltage power supply applies a voltage between the first and second members, which are closely spaced from each other by a few nm in length so as to cause a tunnel current to flow through the vacuum space or the transparent insulating member. Therefore, the light emission from the tunneling region is induced by the optical transition between the respective localized states of the first and second members; and thus, the wavelength of the light emitted from the tunneling region can be easily and flexibly varied by varying the voltage applied between the first member and the second member. In addition, since the light can be emitted from a very small local region in which the tunnel current flows, the wavelength-tunable light emitting device of the present invention can provide a minute wavelength-tunable light source of a size of an atomic scale.

BRIEF DESCRIPTION OF THE DRAWINGS

The above and other objects, features and advantages of the present invention will become more apparent from the following description taken in connection with the accompanying drawings, in which:

FIG. 4 is a graph showing the relation between the wavelength of light emitted from a dangling bond formed on a Si(001)–(2×1)–D surface and voltage; and FIG. 5 is a graph showing the relation between the wavelength of light emitted from a silver cluster formed on a Si(001)–(2×1)–D surface and voltage.

DESCRIPTION OF THE PREFERRED EMBODIMENTS

First Embodiment

Figure 1A:
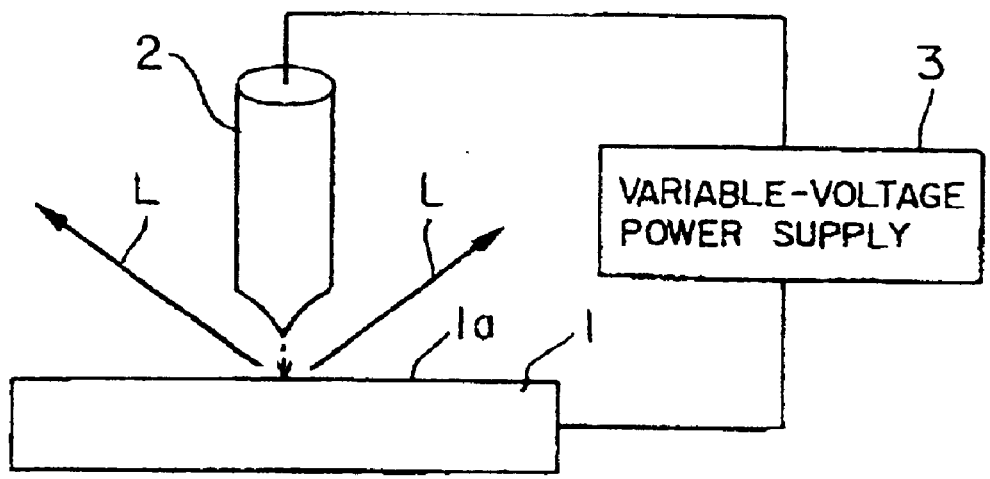
FIGS. 1A and 1B are diagrammatic views of a wavelength-tunable light emitting device in a first embodiment of the present invention.

Referring to FIG. 1A, a wavelength-tunable light emitting device in a first embodiment of the present invention comprises a substrate 1 (first member) provided with an atomic-scale structure, not shown, formed on its surface 1a, a needle member 2 (second member) having a sharp-pointed tip for applying a voltage across a gap between the needle member 2 and the substrate 1 to cause a tunnel current to flow locally through the atomic-scale structure, and a variable-voltage power supply 3 for applying a variable voltage across the gap between the substrate 1 and the needle member 2. A space between the surface 1a of the substrate 1 and the needle member 2 is maintained at a vacuum, and the gap therebetween is a few nm, preferably less than 1 nm in length so that light emission from a tunneling region, in which the tunnel current flows, is induced by an optical transition between respective localized states of the substrate 1 and the needle member 2. The substrate 1 and the needle member 2 are made of a material, e.g., a silicon crystal, that restrains light emission caused by recombination of electrons and holes. The atomic-scale structure formed on the surface 1a of the substrate 1 is a silicon dangling bond, atoms of a metal, organic molecules, atoms of a metalloid or inorganic molecules. The term 'atomic-scale' as used in this specification signifies the level of a size of a structure that produces light when a tunnel current flows, such as a size in the wide range of angstroms to several hundreds nanometers.

In addition, the substrate 1 is preferably provided with a surface structure made of noble metal, not shown, formed on its surface 1a, for inducing surface plasmons of the substrate 1 to intensify or guide the light emitted from the tunneling region.

When a predetermined voltage is applied across the gap between the substrate 1 and the needle member 2, a tunnel current flows from the tip of the needle member 2 to the atomic-scale structure formed on the surface 1a of the substrate 1, and light L of a predetermined wavelength is emitted from a local region (tunneling region) in which the tunnel current flows, e.g., the atomic-scale structure formed on the surface 1a of the substrate 1, or the tip of the needle member 2. When the voltage applied across the gap between the substrate 1 and the needle member 2 is varied by the variable-voltage power supply 3 in the range of ±0 to ±30 V, the wavelength of the light L emitted from the tunneling region varies in the range of 200 to 1500 nm.

Thus, the wavelength-tunable light source in the first embodiment is capable of easily and flexibly varying the wavelength of the light L emitted from the tunneling region by simply varying the voltage applied across the gap between the substrate 1 and the needle member 2. Since the light L can be emitted from a local region in which the tunnel current flows, the wavelength-tunable light emitting device can provide an atomic-scale minute wavelength-tunable light source. It is noted that this minute wavelength-tunable light source can be used as a light source in nano-size for integrated electronic circuits or light circuits.

Figure 1B:
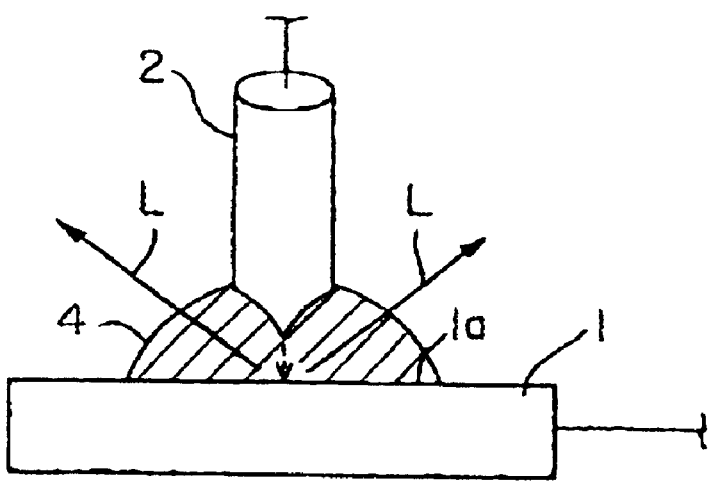

The space surrounding the surface 1a of the substrate 1 and the needle member 2 may be filled up with a transparent, insulating covering 4 as shown in FIG. 1B instead of being maintained at a vacuum.

It is noted that the atomic-scale structure is employed to form a desired localized state on the surface 1a of the substrate 1, causing the optical transition between the respective localized state of the substrate 1 and the needle member 2. Therefore, it is obvious that the atomic-scale structure may be eliminated from the substrate 1 as long as the desired localized state can be formed on the surface 1a of the substrate 1.

Second Embodiment

A wavelength-tunable light emitting device in a second embodiment of the present invention is substantially the same in configuration as the wavelength-tunable light emitting device in the first embodiment except that the wavelength-tunable light emitting device in the second embodiment has components formed in patterns on an insulating support using thin-film technology and so on. The wavelength-tunable light emitting device in the second embodiment will be described with reference to FIGS. 2A, 2B and 2C, in which parts like or corresponding to those of the first embodiment are designated by the same reference numerals and the description thereof will be omitted.

Figure 2A:
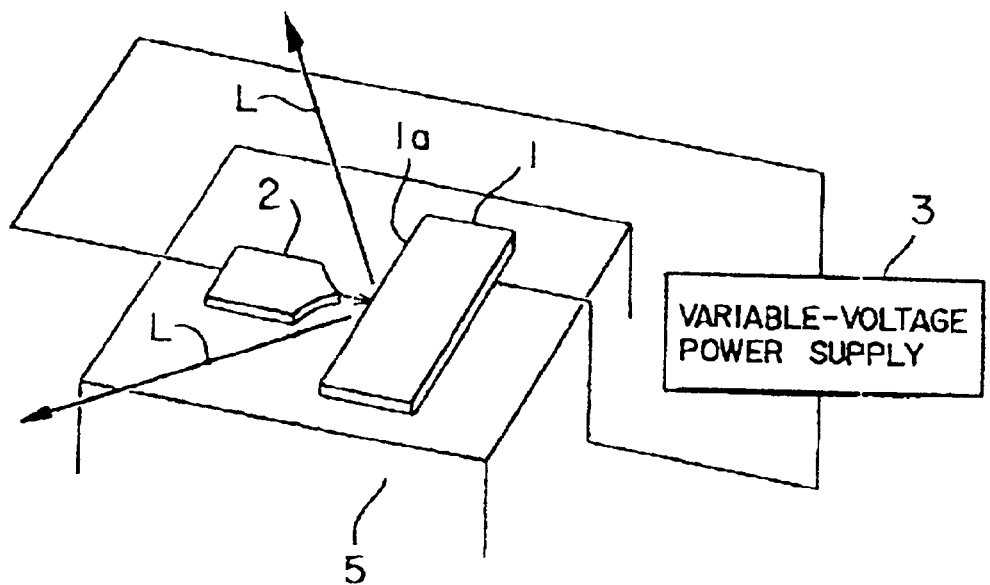
FIGS. 2A, 2B and 2C are diagrammatic views of a wavelength-tunable light emitting device in a second embodiment of the present invention.

Referring to FIG. 2A, a wavelength-tunable light emitting device in a second embodiment of the present invention comprises a first member 1, a second member 2, an insulating support 5 supporting the first member 1 and the second member 2 on its surface, and a variable-voltage power supply 3. The first member 1 and the second member 2 are formed by defining patterns in a layer that is formed on the insulating support 5. An atomic-scale structure, not shown, is formed on a side surface 1a of the first member 1 facing a sharp-pointed tip of the second member 2. A space between the side surface 1a of the first member 1 and the second member 2 is maintained at a vacuum, and the gap therebetween is a few nm, preferably less than 1 nm. When a predetermined voltage is applied across the gap between the first member 1 and the second member 2, a tunnel current flows through the atomic-scale structure and light L of a predetermined wavelength is emitted from the tunneling region. When the voltage applied across the gap between the gap between the first member 1 and the second member 2 is varied in the range of ±0 to ±30 V, the wavelength of the light L emitted from the the tunneling region varies in the range of 200 to 1500 nm.

Figure 2B:
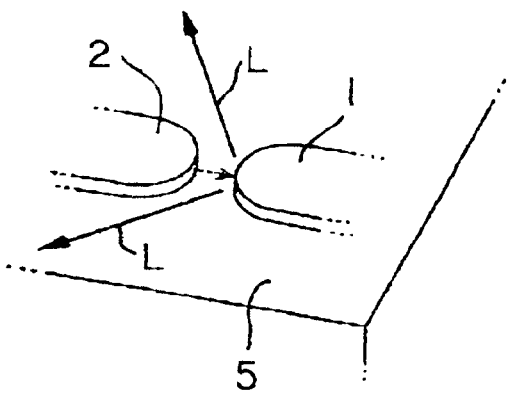
Figure 2C:
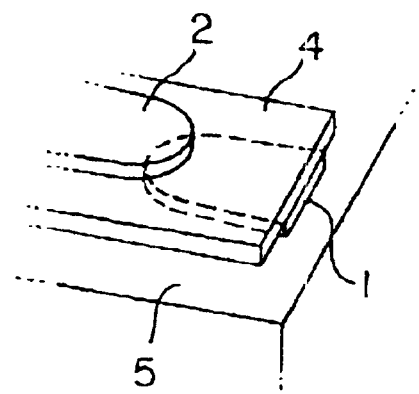

Effects and functions of the wavelength-tunable light emitting device in the second embodiment are the same as those of the wavelength-tunable light emitting device in the first embodiment. The first member 1 and the second member 2 may be formed in such optional patterns as shown in FIG. 2B. The space between the side surface 1a of the first member 1 and the second member 2 may be filled up with a transparent insulating sheet 4 so as to seal the atomic-scale structure as shown in FIG. 2C instead of being maintained at a vacuum. In FIG. 2C, the first member 1 and the second member 2 are layers that are layered on an insulating support 5. The first member 1 and the second member 2 are layered via a transparent insulating layer 4 so as to form the gap between the first member 1 and the second member 2.

Examples of the wavelength-tunable light emitting device shown in FIG. 1A will be described hereinafter.

EXAMPLE 1

Figure 3:
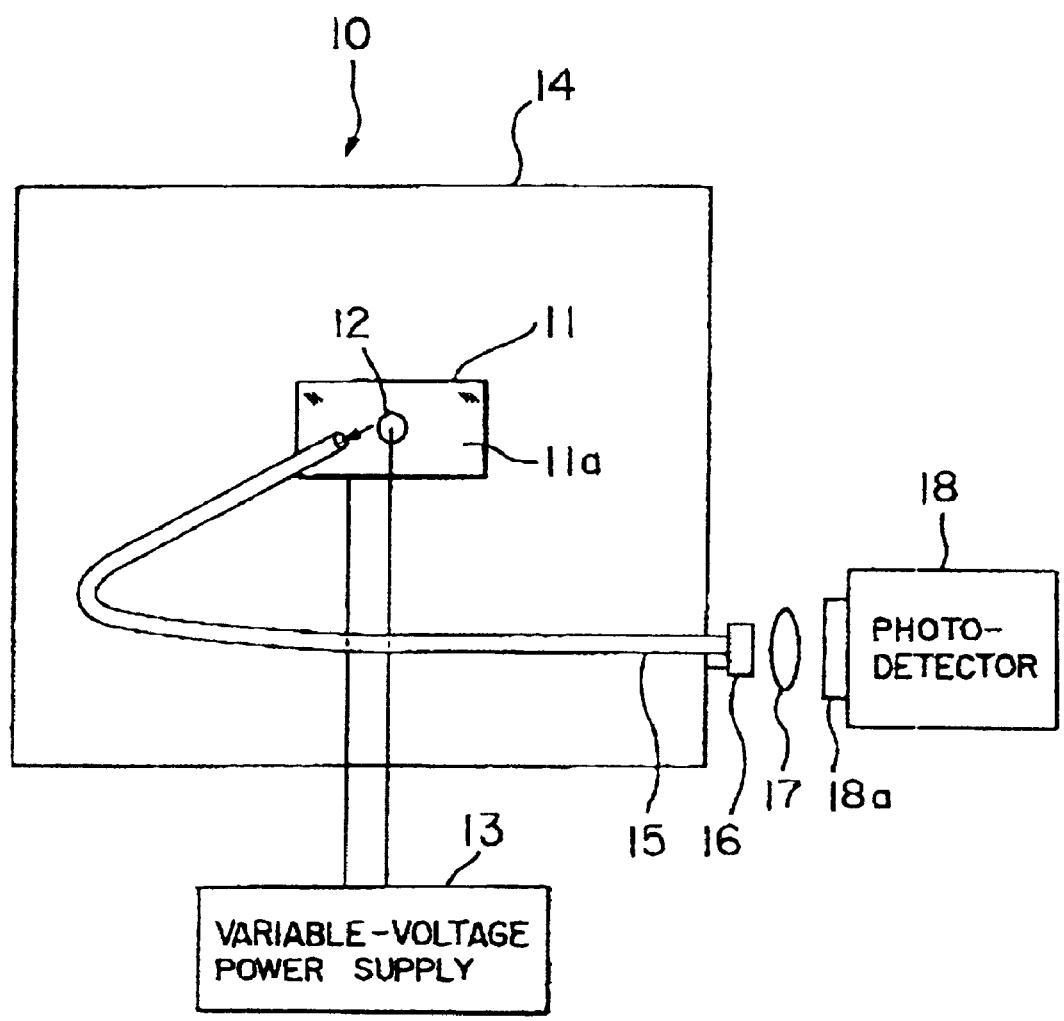
FIG. 3 is a diagrammatic view of testing apparatus for testing the characteristics of the wavelength-tunable light emitting device shown in FIG. 1A.

FIG. 3 shows a testing apparatus for testing the characteristics of the wavelength-tunable light emitting device shown in FIG. 1A, and FIG. 4 is a graph showing the relation between wavelength region of light emitted from a dangling bond formed on a Si(001)–(2×1)–D surface and voltage. As shown in FIG. 3, a wavelength-tunable light emitting device in Example 1 has a substrate 11, which corresponds to the substrate 1 shown in FIG. 1A. The substrate 11 has a dangling bond region of a predetermined square area of 14×14 $nm^2$ formed by extracting deuterium atoms (D) from a local region of a surface of a silicon crystal (Si(001)–(2×1)–D) ended by deuterium atoms (D). The wavelength-tunable light emitting device employs a probe 12 of a scanning tunnel microscope 10 as the needle member 2 shown in FIG. 1A.

The scanning tunnel microscope 10 has a vacuum vessel 14 for containing the substrate 11, the probe 12 for supplying a tunnel current to the dangling bond region by applying a voltage to a local region of the surface 11a of the substrate 11, and a variable-voltage power supply 13 for applying variable voltage across the gap between the substrate 11 and the probe 12. A glass fiber bunch 15 has one end disposed near the probe 12 to collect light emitted from the dangling bond region formed in the surface 11a of the substrate 11 and the other end connected to a light emitting member 16. Light emitted through the light emitting member 16 is converged through a condenser lens 17 on a light receiving surface 18a of a photodetector 18 to measure the energy distribution in the light.

The probe 12 of the scanning tunnel microscope 10 was disposed above the dangling bond region of the substrate 11. Voltages (bias voltage) $V_s$ of –2.5 V, –3.0 V, –3.5 V and –4.0 V were applied by the variable-voltage power supply 13 across the gap between the surface 11a of the substrate 11 and the probe 12 and energy distribution in the light was measured by the photodetector 18. A tunnel current $I_t$ that flowed through the surface 11a of the substrate 11 and the probe 12 was 5 nA. Light intensity (photon intensity) measuring time T, i.e., the duration of stay of the probe 12 at a position corresponding to the dangling bond region, was 300 s. As obvious from measured results shown in FIG. 4, the wavelength of the light decreased with the increased negative value of the substrate bias $V_s$.

EXAMPLE 2

A wavelength-tunable light emitting device in Example 2 of the wavelength-tunable light emitting device in the first embodiment shown in FIG. 1A will be described with reference to FIGS. 3 and 5. FIG. 5 is a graph showing the relation between the wavelength of light emitted from a silver cluster formed on a Si(001)–(2×1)–D surface and voltage.

The wavelength-tunable light emitting device in Example 2 has a substrate 11, which corresponds to the substrate 1 shown in FIG. 1A. The substrate 11 has an isolated silver cluster formed by making a circular dangling bond region of 2.5 nm in diameter formed on a Si(100)–(2×1)–D surface attract silver atoms (Ag). The wavelength-tunable light emitting device has a probe 12 of a scanning tunnel microscope 10 as the needle member 2 shown in FIG. 1A.

The probe 12 of the scanning tunnel microscope 10 was disposed above the silver cluster and voltages (bias voltages) $V_s$ of +2.2 V, +2.5 V, 3.0 V, +3.2 V and +3.5 V were applied by a variable-voltage power supply 13 across the gap between the substrate 11 and the probe 12 and energy distribution in the light was measured by a photodetector 18. A tunnel current $I_t$ that flowed through the surface 11a of the substrate 11 and the probe 12 was 3 nA. Light intensity (photon intensity) measuring time T, i.e., the duration of stay of the probe 12 at a position corresponding to the silver cluster, was 100 s. As obvious from measured results shown in FIG. 5, the wavelength of the light decreased with the increased positive value of the substrate bias $V_s$.

As is apparent from the foregoing description, according to the present invention, the wavelength-tunable light emitting device is capable of easily and flexibly varying the wavelength of the light emitted from the tunneling region by varying the voltage applied across the gap between the substrate and the needle member. Since the light can be emitted from a local region in which the tunnel current flows, the wavelength-tunable light emitting device is able to provide an atomic-scale minute wavelength-tunable light source.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A wavelength-tunable light emitting device comprising:
a first member;
a second member spaced from the first member through a vacuum space or a transparent insulating member; and
a variable-voltage power supply for applying a voltage between the first member and the second member to cause a tunnel current to flow, said variable-voltage power supply being adapted to vary the voltage applied between the first member and the second member;
wherein the first member and the second member are separated by the vacuum space or the transparent insulating member from each other by a gap of a few nm in length so that light emission from a tunneling region, in which the tunnel current flows, is induced by an optical transition between respective localized states of the first member and the second member that are spatially separated from each other, whereby a wavelength of the light emitted from the tunneling region is varied in accordance with variation of the voltage applied between the first member and the second member.

2. The wavelength-tunable light emitting device according to claim 1, wherein the first member and the second member are made of a material that restrains light emission caused by recombination of electrons and holes.

3. The wavelength-tunable light emitting device according to claim 1, wherein the first member has an atomic-scale structure formed on a surface thereof, the atomic-scale structure being placed in the tunneling region.

4. The wavelength-tunable light emitting device according to claim 3, wherein the atomic-scale structure is a silicon dangling bond formed in the surface of the first member.

5. The wavelength-tunable light emitting device according to claim 3, wherein the atomic-scale structure is a material selected from the group consisting of atoms of a metal, organic molecules, atoms of a metalloid and inorganic molecules.

6. The wavelength-tunable light emitting device according to claim 1, wherein the first member and the second member are formed by defining patterns in a layer that is formed on an insulating support by using a thin-film technology.

7. The wavelength-tunable light emitting device according to claim 1, wherein the first member and the second member are layers that are layered on an insulating support by using a thin-film technology, with the first member and the second member being layered via a transparent insulating layer so as to form the gap between the first member and the second member.

8. The wavelength-tunable light emitting device according to claim 1, wherein said device is used as a minute light source for an integrated electronic circuit or a light circuit.

* * * * *